United States Patent
Yoshinari

(10) Patent No.: US 9,418,640 B2
(45) Date of Patent: Aug. 16, 2016

(54) RECORDING APPARATUS

(71) Applicant: TEAC Corporation, Tokyo (JP)

(72) Inventor: Daisuke Yoshinari, Tokyo (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 14/747,773

(22) Filed: Jun. 23, 2015

(65) Prior Publication Data

US 2016/0012808 A1     Jan. 14, 2016

(30) Foreign Application Priority Data

Jul. 9, 2014 (JP) .................................. 2014-141254

(51) Int. Cl.
*G10H 1/00* (2006.01)
*G11B 27/00* (2006.01)

(52) U.S. Cl.
CPC .............. *G10H 1/0033* (2013.01); *G11B 27/00* (2013.01); *G10H 2240/171* (2013.01)

(58) Field of Classification Search
CPC . G11B 27/00; G10H 1/0033; G10H 2240/171
USPC .................................................. 84/601–604
See application file for complete search history.

(56) References Cited

U.S. PATENT DOCUMENTS

| | | | |
|---|---|---|---|
| 2002/0020279 A1* | 2/2002 | Funaki ................. | G09B 15/001 84/478 |
| 2005/0147385 A1* | 7/2005 | Takahashi ............ | G11B 27/034 386/230 |
| 2010/0222905 A1* | 9/2010 | Chou ...................... | G09B 5/04 700/94 |
| 2013/0216208 A1* | 8/2013 | Kummer ................ | H04N 5/782 386/292 |
| 2014/0136661 A1* | 5/2014 | Handa ................. | H04L 65/1069 709/219 |

FOREIGN PATENT DOCUMENTS

| | | |
|---|---|---|
| JP | 2001-119664 A | 4/2001 |
| JP | 2006-217111 A | 8/2007 |

* cited by examiner

*Primary Examiner* — David Warren
(74) *Attorney, Agent, or Firm* — Seed IP Law Group PLLC

(57) ABSTRACT

A recording apparatus capable of readily setting a desired recording condition at the time of recording a music signal to music data and maintaining the recording conditions even when transmitting the recorded music file data to another equipment. A system controller acquires recording condition parameters employed in recording a voice signal, appends the parameters to music data to generate music file data, and stores the data into SD memory, or the like. Music file data are selected at the time of new recording operation, and recording condition parameters appended to the selected music file data are read, whereby recording conditions are automatically set.

12 Claims, 3 Drawing Sheets

RECORDING APPARATUS

PRIORITY INFORMATION

This application claims priority to Japanese Patent Application No. 2014-141254 filed on Jul. 9, 2014, which is incorporated herein by reference in its entirety.

BACKGROUND

1. Technical Field

The present invention relates to a recording apparatus and, more particular, to management of recording conditions.

2. Related Art

Operation of recording equipment to set a recording level, a recording mode, sound effects, and the like, becomes necessary at the time of recoding an audio signal.

JP 2001-119664A describes recording setting information about recording and reproducing apparatus compatible with program streams and its peripheral devices on the same recording medium where the program streams are to be recorded.

JP 2006-217111A describes recording a plurality of pieces of recording setting information corresponding to a plurality of picture-recorded scenes and controlling recording operation to be performed during picture-taking operation, on the basis of recording setting information corresponding to designated picture-recorded scenes.

It is effective to record the setting information about the recording and reproduce apparatus and its peripheral devices on the recording medium is effective. However, when stream data pertaining to a specific program are extracted from the recording medium and transmitted to another medium, the setting information of the program stream data comes to be lost. Particularly, in the case of a recording apparatus in which data to be recorded are a music signal, recorded music file data are often transmitted to another equipment or another medium by way of the Internet or by way of a LAN, a Wi-Fi device, and others. Therefore, the problem can come to the surface.

SUMMARY

The present invention provides an apparatus capable of readily setting desired recording conditions when receiving a music signal. Additionally, the present invention provides an apparatus capable of maintaining the recording conditions intact even when transmitting recorded music file data to another equipment, or the like.

A recording apparatus of the present invention comprises:
means for acquiring recording setting information at the time of recording a music signal as music data;
means for generating music file data by appending the acquired recording setting information to the music data; and
means for storing the generated music file data.

In one embodiment of the present invention, the recording apparatus further comprises:
means for selecting desired music file data from one or a plurality of sets of music file data stored in the storage means; and
means for acquiring the recording setting information appended to the selected music file data and automatically setting the information as recording setting information at the time of recording another music signal.

In the present invention, the recording setting information includes at least any of a recording level, a recording mode, a limiter level, and activation/deactivation a low cutoff.

According to the present invention, desired recording conditions can be readily set at the time of recording a music signal. Moreover, recording setting information already remains appended to music file data as its portion. Accordingly, even when the music file data are transmitted to another equipment, the recording conditions can be maintained and reproduced intact.

The present invention will be more clearly comprehended by reference to the embodiments provided below. However, the embodiments provided below are illustrative, and the scope of the invention is not limited to the embodiments.

BRIEF DESCRIPTION OF THE DRAWINGS

A preferred embodiment of the present invention will be described in detail by reference to the following drawings, wherein.

DETAILED DESCRIPTION

An embodiment of the present invention is hereunder described by taking a portable digital recorder as an example. The portable digital recorder generally receives an input music signal (signals including a voice signal and a musical sound signal are defined as music signals) from a sound source; converts the music signal into a digital signal and subjects the digital signal to predetermined signal processing; and stores the thus-processed signal as music file data into a built-in or external storage medium. The portable digital recorder can also have two channels (a R-channel and a L-channel) or more. Moreover, the portable digital recorder can also have a function of mixing music signals input through a plurality of channels together and recording the music signals. The portable digital recorder can be connected with a computer byway of a USB, or the like, and can exchange music file data with the computer.

Figure 1:
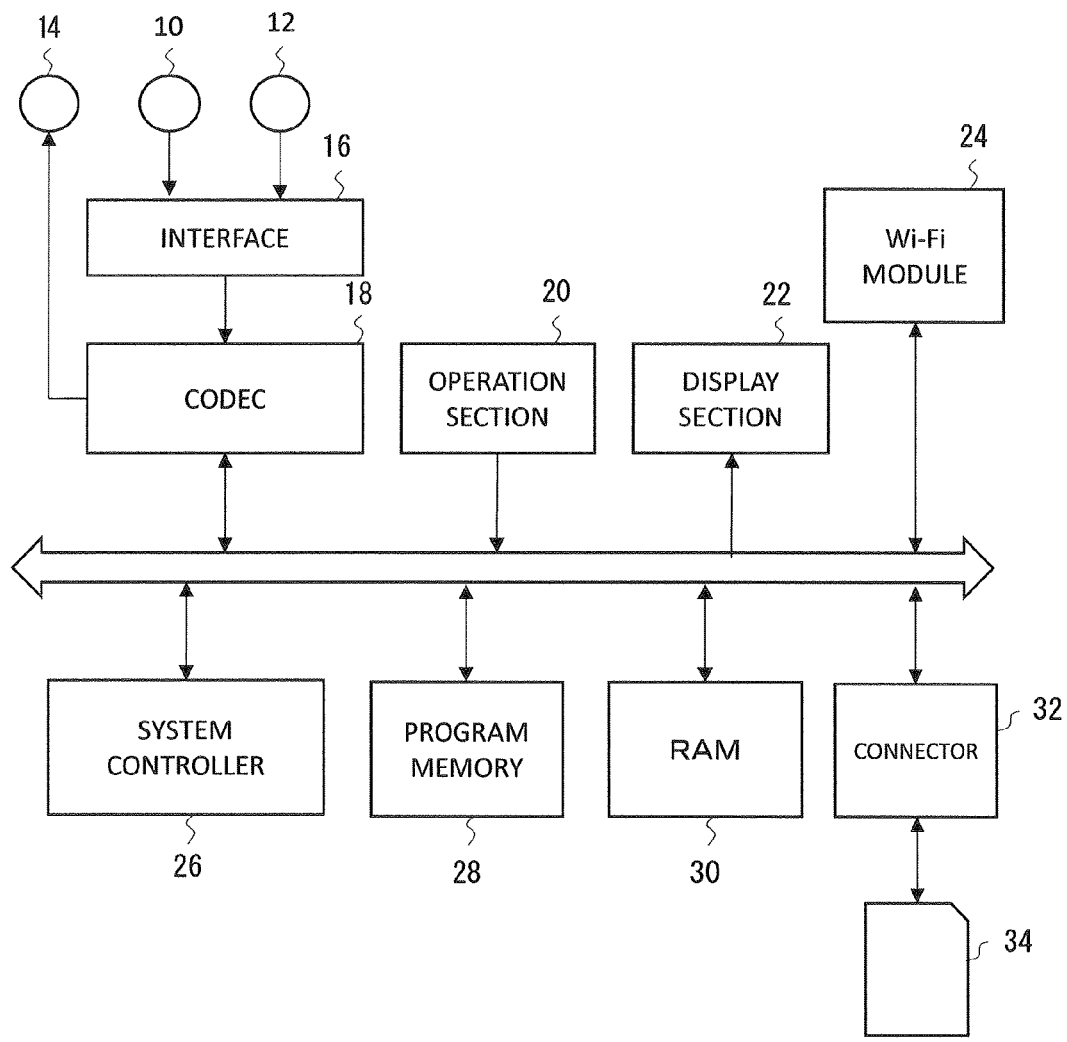
FIG. 1 is a configuration block diagram of an embodiment.

FIG. 1 is a configuration block diagram of a portable digital recorder of the present embodiment. The portable digital recorder has a directional or non-directional built-in microphone 10, an external input terminal 12, a speaker 14, an interface 16, a coded (CODEC) 18, an operation section 20, a display section 22, a Wi-Fi module 24, a system controller 26, program memory 28, RAM 30, a connector 32, and SD memory 34. These elements are interconnected by way of a bus.

The built-in microphone 10 and the external input terminal 12 are configured interchangeably as input sources, receive an input music signal from the sound source, and supply the signal to the interface 16. The interface 16 controls a level of the sound signal and outputs the sound signal to the coded 18.

The coded 18 converts an analog music signal into a digital signal and outputs the digital signal as a digital music signal to the system controller 26 after having encoded the digital signal. The coded 18 decodes the digital music signal supplied from the system controller 26, converts the thus-decoded signal into an analog signal, and outputs the analog signal from the speaker 14. An example of encoding is PCM but not limited to PCM. Further, an analog music signal can also be compressed (reversibly or irreversibly), together with being encoded, as necessary.

The operation section 20 includes various buttons and dials. A user performs various operations on the operation section 20, and operation results are supplied to the system controller 26. The various operations include initiation of recording, cessation, a pause, reproduction, fast-forwarding, input switching, a menu display, recording-level control, a recording mode, sound effects (a limiter and a low cutoff), delay control, creating of a folder, selection/deletion of a music file, transmission of a music file, and others.

The display section 22 is made up of a liquid-crystal panel or an organic EL panel and displays a variety of pieces of information. The pieces of information include a recording level, a recording time, a folder list, a music file list, levels of respective channels in the case of a plurality of channels.

The Wi-Fi module 24 exchanges music file data and other data with another Wi-Fi equipment. Data can also be exchanged with a smartphone by way of the Wi-Fi module 24. Alternatively, the smartphone can also control a portable digital recorder by transmitting control data to the portable digital recorder.

The system controller 26 is made up of a CPU. In accordance with a processing program stored in the program memory 28, like EEPROM, the system controller 26 performs predetermined processing by using the RAM 30 as working memory. In the present embodiment, the system controller 26 performs operation of generating music file data in a predetermined format particularly, during recording operation; acquiring recording setting information included in music file data selected by the user; and reflecting the acquired recording setting information on a setting during recording. The system controller 26 stores the generated music file data in the SD memory 34 by way of the connector 32. In addition, the system controller 26 reads from the SD memory 34 the music file data selected by the user, and reproduces the music file data or acquires the recording setting information included in the music file data. Functions of the system controller 26 are enumerated blow.

Acquiring recording setting information at the time of recording.

Generating music file data by appending the recording setting information to music data (a music signal)

Storing the generated music file data into a recording medium.

Acquiring (reading) the recording setting information added to the selected music file data.

Reflecting (automatically setting) the acquired (read) recording setting information on recording setting information to be used in next recording.

In this regard, the recording setting information can also be translated into recording conditions to be employed in recording. In the following, the recording setting information is hereunder explained as recording conditions or recording condition parameters, as appropriate.

Figure 2:
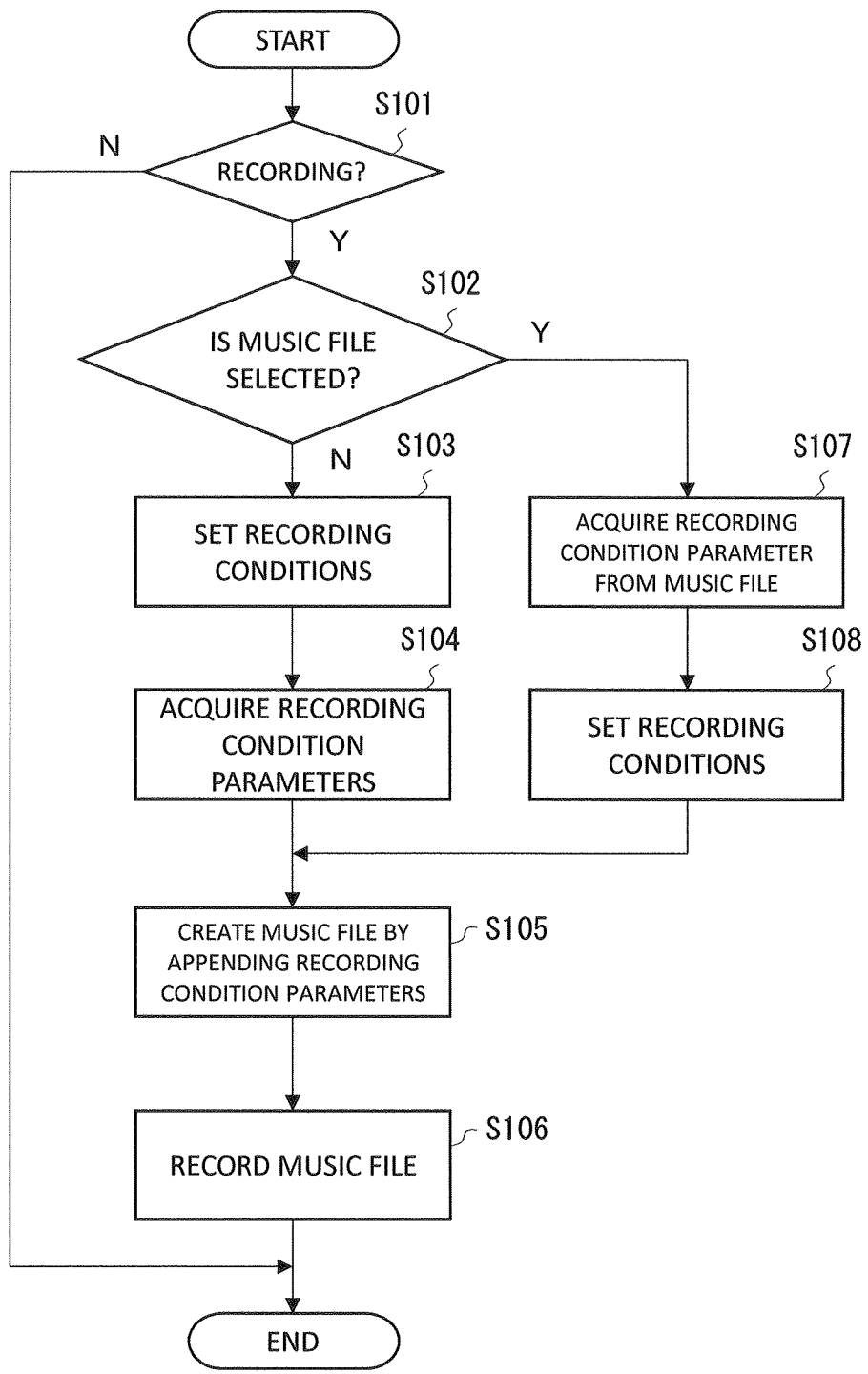
FIG. 2 is a processing flowchart of the embodiment.

FIG. 2 is a processing flowchart employed at the time of recording in the present embodiment. The system controller 26 reads programs stored in the program memory to execute the programs in sequence.

First, the system controller 26 determines whether or not to perform recording in accordance with an operation signal from the operation section 20 on which the user has performed operation (S101). When desiring to record a music signal, the user presses down on a record button, one of the buttons on the operation section 20, to command performance of recording operation. The user can also operate a recording icon on the touch panel by touch. When recording is selected (YES in S101), the system controller 26 next determines whether or not the user has selected a music file, in accordance with the operation signal from the operation section 20 (S102). When a music file is not yet present or when the user desires to set recording conditions anew even when the music file is present, the user does not select a music file. When the music file is not selected (NO in S102), the user newly sets recording conditions by operating the operation section 20 (S103). Although the recording conditions include a recording level, a recording mode, a limiter, a low cut-off, delay control, and others, the recording conditions are not limited to these conditions. Arbitrary conditions required at the time of recording an audio signal can also be included in the recording conditions.

When the user sets the recording level, the recording mode, and the like, by operating the operation section 20, the system controller 26 performs recording under the recording conditions in accordance with the operation signal from the operation section 20, and acquires the recording conditions set by the user as recording condition parameters (S104). The recording condition parameters consist of; for instance, a set of parameters (a recording level, a recording mode, a limiter level, a low cut-off, and a delay). The user individually sets the recording level, the recording mode, the limiter level, the low cutoff, and the delay by operating the operation section 20. The recording mode can include a distinction between PCM recording and MP3 recording, a distinction between sampling frequencies, etc. The low cutoff include activation/deactivation of a low cutoff and distinctions between frequencies of the low cutoff. The delay includes activation/deactivation of a function of intentionally delaying recording operation. By activating the delay function, recording starts with a delay of a predetermined period since the recording button was operated, so that mixing of noise into recording, which would otherwise be induced by operation of the button, can be prevented.

Having acquired the recording condition parameters, the system controller 26 generates music file data in a predetermined format by appending the acquired recording condition parameters to music data (S105), storing the music file data into the SD memory 34 (S106). The format of the music file data will be further described later. In a case where the music file data are generated by appending recording condition parameters, a flag showing addition of the recording condition parameters is previously set on a header, or the like, of the music file data.

When YES is selected in S102; that is, when the user has selected a desired music file by actuation of a jog dial which is one of the members on the operation section 20, the system controller 26 reads the selected music file data from the SD memory 34, acquiring the recording condition parameters appended to the thus-read music file data (S107). When the user selects a music file, it is desirable for the system controller 26 to display on the display section 22 a list of music files with the appended recording condition parameters to facilitate user's selection. Specifically, when the user operates a specific button on the operation section 20, the system controller 26 makes an access to the SD memory 34 in response to an operation signal, extracting music file data with appended recording condition parameters from the music file data stored in the SD memory 34 (extracts music file data with a flagged header) and displaying a designation of the music file data on the display section 22 in list form. As a matter of course, it may also be possible to display designations of all of the music file data stored in the SD memory 34 on the display section 22 in list form and provide specific marks to the music file data with the appended recording condition parameters. For instance, Session 1.wav
Session 2.wav
*Session 3.wav
*Session 4.wav In the above examples, asterisks (*) appended to the files designate addition of the recording condition parameters.

When the user selects desired music file data from among the music file data displayed in list by actuation of the jog dial, or the like, the system controller 26 acquires (or reads) recording condition parameters appended to the selected music file data. After acquiring the recording condition parameters, the system controller 26 sets recording conditions by use of the acquired recording condition parameters (S108), performing recording. Specifically, the system controller 26 controls the interface 16 and the coded 18 to automatically set respective parameters, like a recording level, a limiter, a low cut-off, and a delay, performing recording. If the recording conditions are already set, the acquired recording condition parameters are newly, automatically set in place of the existing recording conditions.

Subsequent operations are the same as those employed when a music file is not selected. Music file data are generated by appending recording parameters (S105), and the thus-generated music file data are stored in the SD memory 34 by way of the connector 34 (S106). The recording condition parameters employed in this case are the same as recording condition parameters acquired in S107.

More specific explanations are as follows. Assume that the user records specific music under specific recording conditions in a certain studio and stores the music under a designation of "music 1.wav" in a specific folder. Recording condition parameters are added as a portion of the music file data to the "music 1.wav" file data and stored as Recording Level=L1
Recording Mode=PCM
Limiter Level=Lm1
Low Cutoff=40 Hz
Delay=ON.

When the same or a different user records another music under desired recording conditions in another studio, the user often sets recording conditions to the desired recording conditions by operating the operation button 20, performs recording, and stores the music under a designation of "music 2.wav" in the same or another folder. The recording condition parameters are appended to the "music 2.wav" file data and stored as Recording Level=L2
Recording Mode=PCM
Limiter Level=Lm2
Low Cutoff=40 Hz
Delay=OFF.

Meanwhile, when the same or a different user attempts to record another music in the same studio under the same recording conditions as those used in recording the music 1, the user operates the operation section 20 at the time of recording to select the "music 1.wav" file, thereby setting the recording conditions to the same conditions of the "music 1.wav." The user then stores the music under a designation of "music 3.wav" in a specific folder. It should be noted that the user should simply select a music file rather than elaborately setting recording conditions by operating the operation section 20.

As above, when performing recording, the user simply selects a music file rather than setting recording conditions each time, whereby recording conditions that are the same as those used in recording the music file are automatically set. Therefore, recording can be performed under desired conditions very easily. The user holds in his/her memory the conditions used in recording specific music at a specific location and often desires to perform recording under the same conditions as those used at that time. In the present embodiment, the condition parameters used at that time are stored while remaining appended to the music file data. Accordingly, recording conditions can be automatically set in agreement with the user's actual recording procedures or sense of recording.

It is also possible to acquire recording condition parameters, store the acquired recording condition parameters in the SD memory 34 together with music file data, and correlate the music file data with the recording condition parameters. However, when the music file data are transmitted to a computer or another equipment, only the recording parameters are left in the SD memory 34. Since the recording condition parameters are not left in the transmitted music file, it becomes impossible to reproduce the recording conditions at a destination. On the contrary, in the present embodiment, the recording condition parameters are present as a portion of the music file data. Therefore, even when the music file data are transmitted to another equipment, the recording condition parameters are also transmitted concomitantly, so that the recording conditions are easily reproduced at a destination.

Further, in the present embodiment, the SD memory 34 is demounted and inserted into another equipment, and the equipment reads music file data from the SD memory 34, whereby the recording condition parameters can be readily set.

Moreover, in the present embodiment, any one of a plurality of pieces of equipment is taken as master equipment, and other pieces of equipment are taken as slave equipment. Music file data are transmitted from the master equipment to the salve equipment, whereby the same recording conditions can also be automatically set on all of the pieces of salve equipment.

Figure 3:
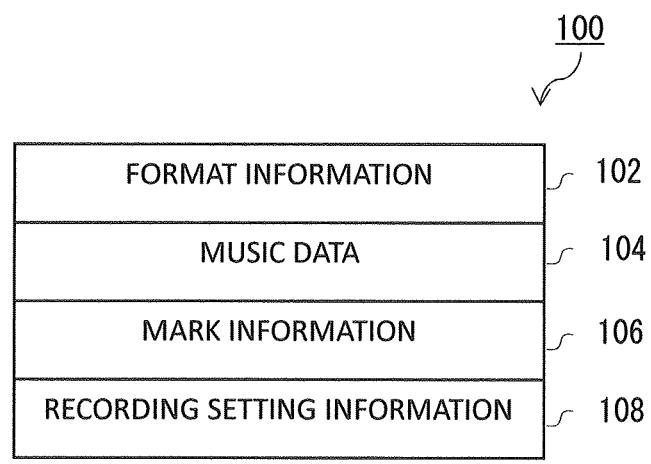
FIG. 3 is a block diagram of music file data of the embodiment.

FIG. 3 is an example configuration of music file data of the present embodiment. The music file data 100 include format information 102, music data 104, mark (Mark) information 106, and recording setting information 108. The mark information 106 is information (bookmark information) to be recorded when recording is resumed after being temporarily suspended and when the user operates a specific button (a mark button) in the middle of recording operation. A jump to a desired position is enabled by use of the mark information. The recording setting information 108 is recording condition parameters. The recording setting information 108 can also be present as a chunk in succession to the music data 104. Alternatively, the recording setting information 108 can also be appended as one of header information to a header. In any event, the recording setting information 108 is appended as a portion of the music file data 100. Since the recording setting information 108 is appended while being separated from the music file data 104, not all the music file data need to be reproduced at the time of acquisition of the recording setting information 108. Only the portion of the music file data with the appended recording setting information 108 can be reproduced and acquired.

Although the present embodiment of the present invention has been described above, the present invention is not limited to the embodiment and susceptible to various modifications.

For instance, it may also be possible to store several recording condition parameters in the program memory 28 in advance and append the recording condition parameters to the music file data. Alternatively, it may also be possible to store three patterns, or thereabouts, of recording condition parameters in the program memory 28 in advance. The user can set recording conditions by selecting any one of the three buttons. When being not satisfied with the three patterns, the user can also set desired recording conditions by selecting a music file.

Moreover, it may also be possible for the system controller 26 to store recording conditions employed in a previous recording session in the program memory 28 or the SD memory 34 in advance. When recording is newly performed, the recording conditions used in the previous recording session are set as default recording conditions. When the user does not select a music file, recording can also be performed under the recording conditions of the previous recording session.

Also, the present embodiment is configured so as to automatically acquire recording condition parameters appended to the music file data by means of the user selecting a music file. Aside from this, when the music file data are reproduced, the recording condition parameters automatically appended to the music file data can also be automatically acquired. When the music file is recorded after being reproduced, it is also possible to automatically set the recording conditions appended to the music file data reproduced immediately before, and initiate recording. In the present embodiment; however, reproducing music file data is not processing indispensable for acquiring recording condition parameters appended to the music file data.

Moreover, in the present embodiment, the recording conditions are automatically set by selecting a music file at the time of recording. However, it may also be possible to display a menu on the display section 22, to select an item of "Setting Recording Conditions," and to select a desired music file from a list of music files displayed on the displays section 22, thereby automatically setting recording conditions. The "automatically setting" the recording conditions in the present embodiment means not manually setting the recording parameters but setting recording conditions that are substantially identical with the recording conditions of a music file by selecting a desirable music file.

Moreover, in the present embodiment, the music file data are stored in the SD memory 34. However, the music file data can also be stored in another storage medium in place of the SD memory 34; for instance, USB memory, or transferred and stored in an external storage device by means of wired or wireless communication. An arbitrary format other than the WAV format and the MP3 format, can also be applied to the file format of the music file data.

Further, in the present embodiment, the user selects a specific music file at the time of recording, whereby recording conditions parameters appended to the music file data are acquired and automatically set as recording conditions. However, the user can carry out recording after having performed additional fine control of the automatically-set recording condition parameters.

Also, the present embodiment has exemplified the recording level, the recording mode, the limiter level, the low cutoff, and the delay as the recording condition parameters. At least any of them can also be used. The recording condition parameters can also include parameters other than the parameters that the user controls by way of the operation section 20 through operation. This signifies that the system controller 26 can also automatically sense ambient environments during recording and automatically append sensed information as recording condition parameters to the music file data.

What is claimed is:

1. A recording apparatus comprising:
   at least one memory, which, in operation, stores at least one processing program; and
   a controller connected to the at least one memory, wherein the controller, in operation:
   acquires recording setting information at a time of recording a music signal as music data;
   generates a music file in which the acquired recording setting information is appended to the music data; and
   stores the generated music file in the at least one memory.

2. The recording apparatus according to claim 1, wherein the controller, in operation:
   receives an indication of a selected music file stored in the at least one memory; and
   acquires the recording setting information from the selected music file; and
   automatically sets the recording setting information included in the selected music file as recording setting information included in another music file, at a time of recording another music signal.

3. The recording apparatus according to claim 1, wherein the recording setting information includes at least one of a recording level, a recording mode, a limiter level, and an activations or a deactivation of a low cutoff frequency.

4. The recording apparatus according to claim 1, wherein the controller, in operation, sets a flag in the music file in which the acquired recording setting information is appended to the music data.

5. The recording apparatus according to claim 1, further comprising a transmitter, which, in operation, transmits the music file in which the acquired recording setting information is appended to the music data stored in the at least one memory to one or a plurality of pieces of equipment.

6. The recording apparatus according to claim 1, wherein the recording setting information is a portion of the music file present as a chunk after the music data.

7. The recording apparatus according to claim 1, wherein the recording setting information is a portion of the music file present as header information.

8. The recording apparatus according to claim 2, wherein the controller, in operation, acquires the recording setting information included in the selected music file without reproducing the music data included in the selected music file.

9. The recording apparatus according to claim 1, wherein, the at least one memory, stores a plurality of pieces of recording setting information acquired prior to the time of recording the music signal as the music data.

10. The recording apparatus according to claim 2, wherein the controller, in operation, changes the recording setting information included in the other music file.

11. A recording apparatus comprising:
    at least one memory, which, in operation, stores at least one processing program; and
    a controller connected to the at least one memory, wherein the controller, in operation:
    acquires recording setting information at a time of recording a music signal as music data;
    appends the acquired recording setting information to a music data to generate a music file; and
    stores the generated music file in the at least one memory.

12. The recording apparatus according to claim 11,
    wherein the controller, in operation, receives an indication of a selected music file from one or a plurality of music files stored in the at least one memory, and
    acquires the recording setting information appended to the music data included in the selected music file and automatically sets recording settings employed in recording another music signal using the recording setting information appended to the music data included in the selected music file.

* * * * *